United States Patent [19]

Hong

[11] Patent Number: 5,187,618
[45] Date of Patent: Feb. 16, 1993

[54] METHOD FOR AUTOMATICALLY PROGRAMMING AND CONTROLLING A NEXT MODE OF A VIDEO TAPE RECORDER

[75] Inventor: Kwon-pyo Hong, Euiwang, Rep. of Korea

[73] Assignee: SamSung Electronics Co., Ltd., Suwon, Rep. of Korea

[21] Appl. No.: 540,687

[22] Filed: Jun. 20, 1990

[30] Foreign Application Priority Data

Dec. 16, 1989 [KR] Rep. of Korea .................... 89 18746

[51] Int. Cl.⁵ ............................................. G11B 15/02
[52] U.S. Cl. ........................................ 360/69; 360/137
[58] Field of Search ............................. 360/69, 71, 137

[56] References Cited
U.S. PATENT DOCUMENTS 4,937,690 6/1990 Yamashita et al. ................ 360/69 X
4,979,057 12/1990 Matsumoto et al. .............. 360/69 X

OTHER PUBLICATIONS

Panasonic advertisement of the M.A.R.C. system from the Apr. 24, 1991 issue of Post.

Primary Examiner—Joseph L. Dixon
Assistant Examiner—David Robertson
Attorney, Agent, or Firm—Robert E. Bushnell

[57] ABSTRACT

A method for automatically controlling the next function of a video cassette recorder or audio cassette tape recorder by a microcomputer is disclosed. The method for automatically performing the next mode comprises checking for selection of a next mode key designating a function to be performed upon completion of the presently operating function; checking whether the selected function is an allowable function; recording in the memory of the selected next function; checking whether the presently operating function is completed; and performing a stored next function recorded in the memory when said present operation is completed.

19 Claims, 4 Drawing Sheets

METHOD FOR AUTOMATICALLY PROGRAMMING AND CONTROLLING A NEXT MODE OF A VIDEO TAPE RECORDER

BACKGROUND OF THE INVENTION

The present invention relates generally to video tape recorders (VTR), more particularly to a method for automatically controlling the next function of a video cassette recorder or audio cassette tape recorder by a microcomputer.

Various apparatus and methods have been proposed to control video cassette recorders. Conventionally, if a user intends to perform an operation on the video tape recorder, the user presses a key corresponding to the desired function which is then immediately performed by the VTR.

In a conventional VTR system shown in FIG. 1, the user presses the key corresponding to the desired function. A system controller 10 detects the selection of the key by the scanning of the keyboard 20. Then, a control signal indicative of the selected key is sent to the mechanism and circuit controller 110 so that the selected function can be performed. Additionally, the system controller 10 displays the selected function on a display 30 or on a cathode ray tube via an on-screen display controller 70.

In another system, the user can select a function via a remote transmitter 40. A signal indicative of the selection is received by the system controller 10 through a remote preamplifier means 50.

The system controller 10 controls a phase lock loop 80 for tuning a desired channel through a tuner 90. A tuner demodulator 100 demodulates the signal of the desired channel which is then provided to the system controller 10.

As is evident from the above description, in conventional VTRs when a user selects a function button on the keyboard 20 or remote transmitter 40, the corresponding function is performed immediately by the system controller 10, and mechanism and circuit controller 110. Therefore, conventional VTRs suffer from the problem that a function which the user desires to be performed after completion of a present function, a next function, can not be programmed. That is, in a conventional VTR, the next function can be entered by pressing the corresponding button after the present function is completed.

SUMMARY OF THE INVENTION

It is therefore an object of the present invention to provide a new method which overcomes the above-identified disadvantages.

More specifically, the present invention provides a method for automatically controlling the next function in a video tape recorder or audio cassette tape recorder, etc.

According to the present invention, there is provided a method for performing next function comprising: checking for selection of a function key which is to be performed as a next function; determining whether the selected function is an allowable next function and returning to the checking step if the selected function is not an allowable next function; storing the selected next function if it is an allowable next function in a memory; determining whether a present function has been completed; performing a next function recorded in the memory when the present function is completed; and determining whether a current address is a final memory address.

The following detailed description, given by way of example, will best be understood in conjunction with the accompanying drawings.

DETAILED DESCRIPTION OF A PREFERRED EMBODIMENT

Figure 1:
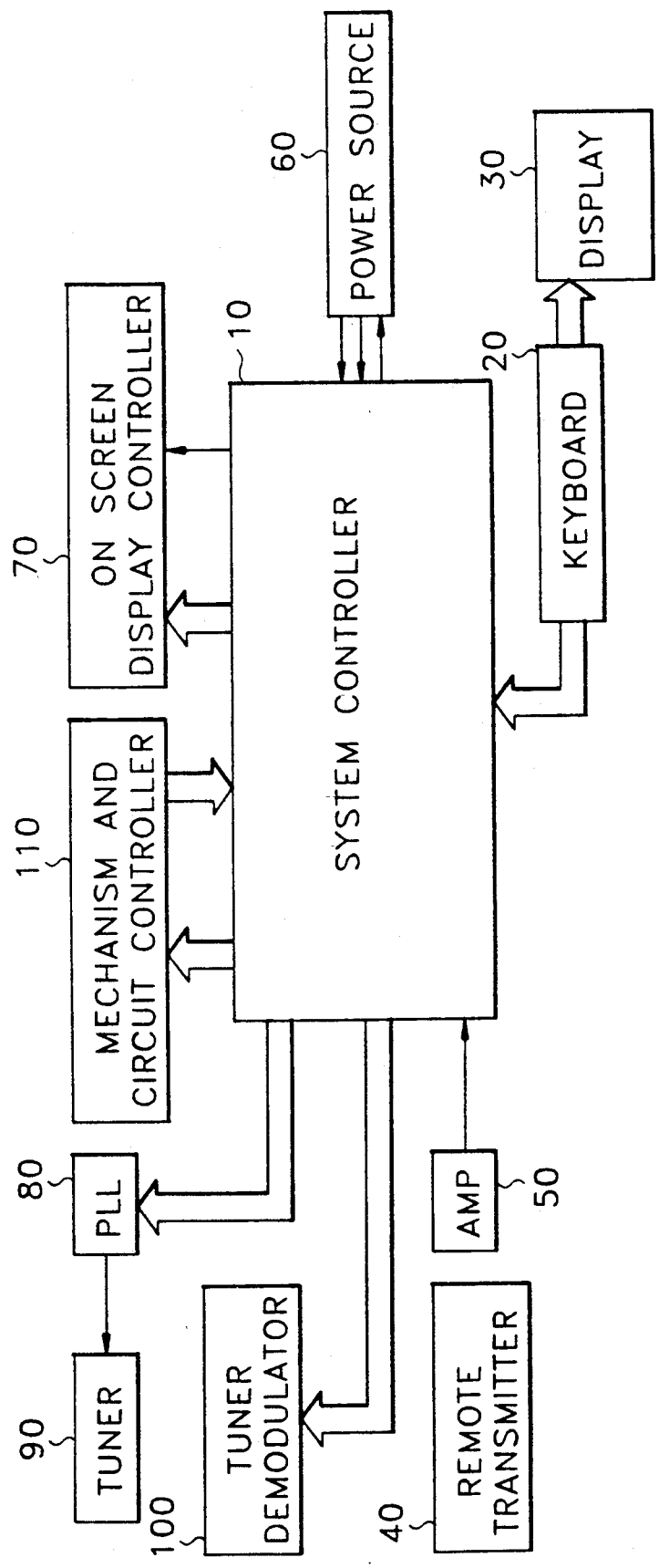
FIG. 1 is a schematic block diagram which is useful in explaining the operation of the typical control method in a video cassette recorder system.
Figure 3:
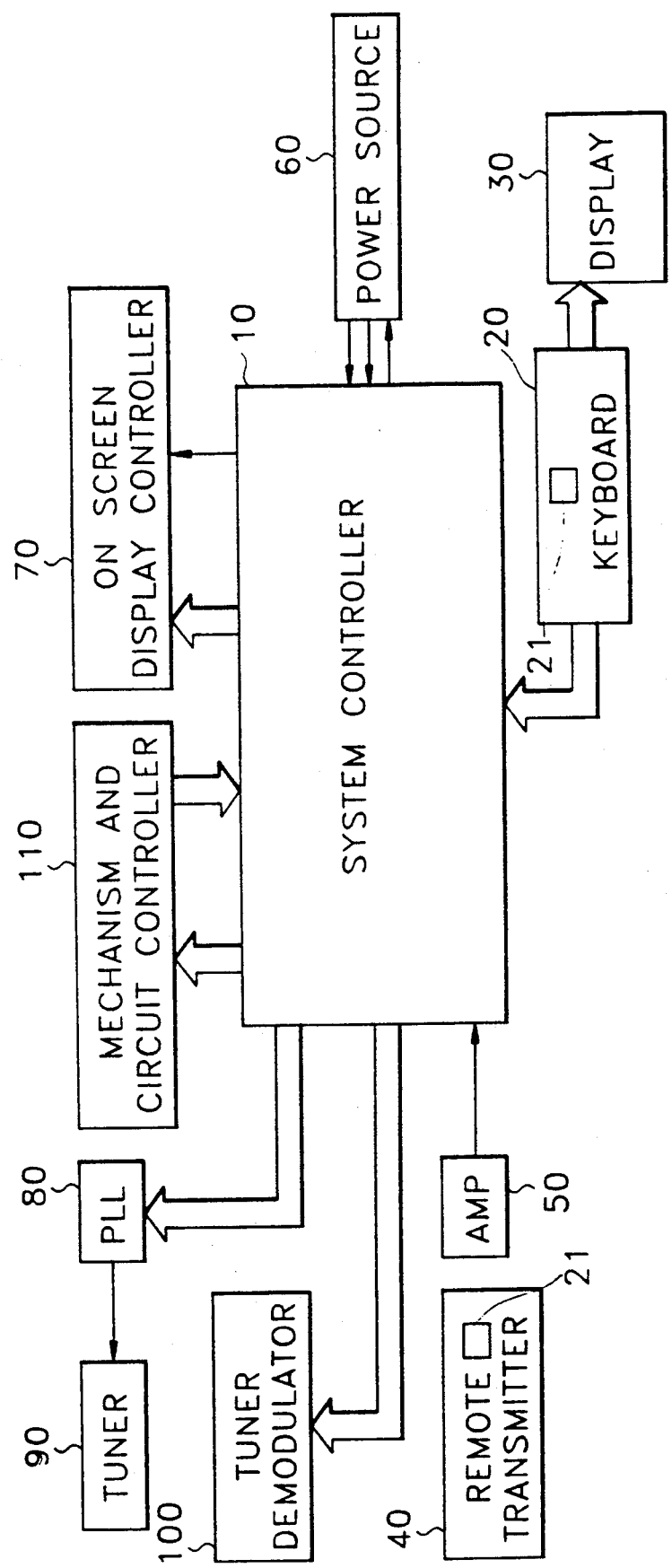
FIG. 3 is a schematic block diagram of a video cassette recorder system constructed according the principles of the present invention.

The construction of a VTR according to the present invention, FIG. 3, is essentially similar to FIG. 1 illustrating the typical arrangement of VTRs. FIG. 3, however, differs to the extent that it provides a next mode key 21 on the keyboard 20 or 41 on remote transmitter 40.

The method for programming a next function of a video tape recorder using the next mode key 21 or 41, according to the present invention, is illustrated in the flow charts of FIGS. 2A and 2B and will now be explained.

Figure 2A:
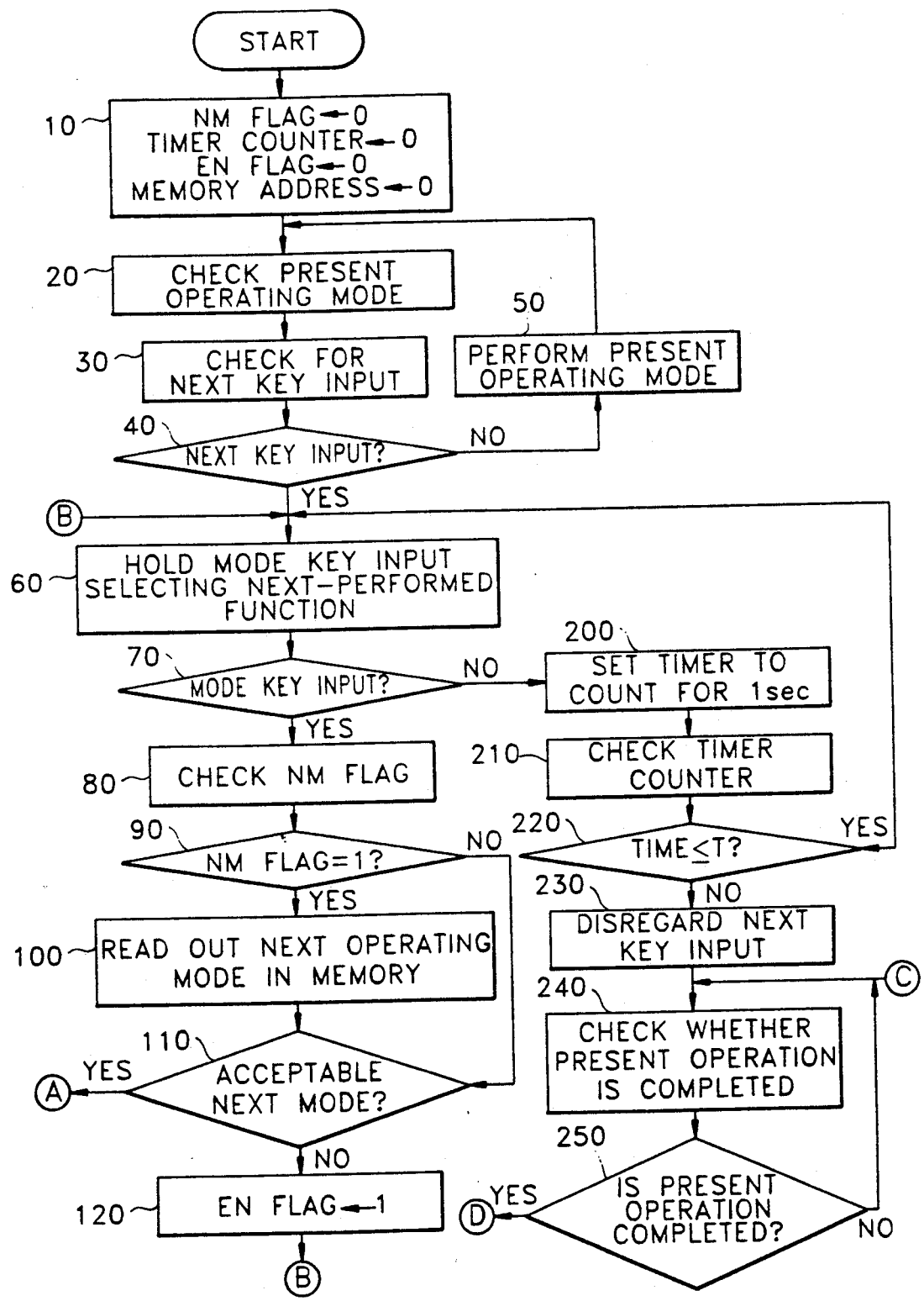
FIGS. 2A and 2B are a flow chart for explaining the next function performing method according to the present invention.
Figure 2B:
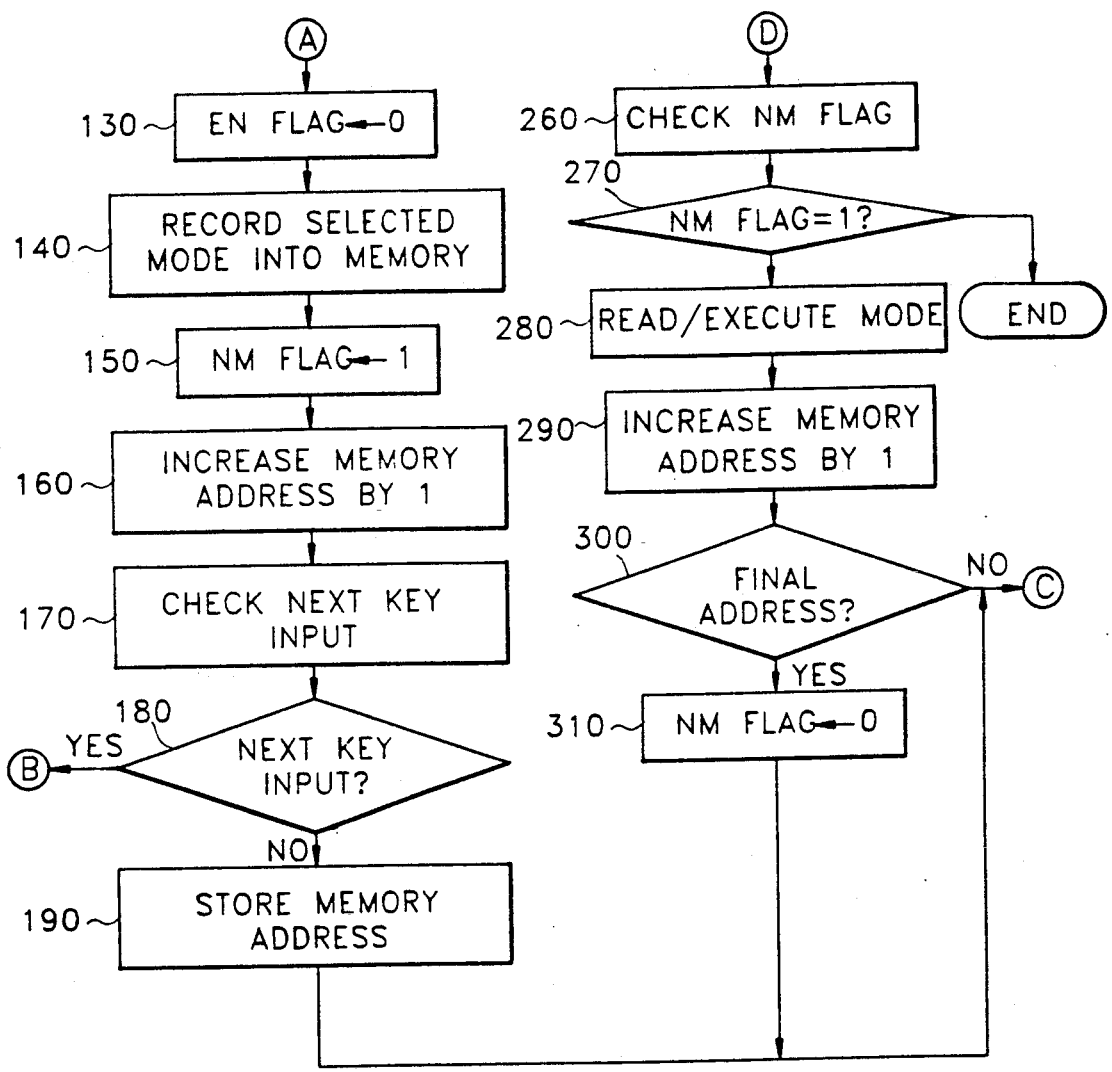

Referring to FIG. 2A, when the VTR is turned on, a next mode flag (hereinafter NM flag), a time counter, an enable flag (hereinafter EN flag), and a memory address are initialized at step 10. At step 20, the current function is analyzed and selection of the next mode key 21 is checked at step 30. At this time, if the next mode key 21 is determined not to have been selected at step 40, the current function is performed continuously at the step 50 and the program loops back to step 20.

If a step 40 selection of the next mode key 21 is detected, the VTR checks selection of a function to be performed next at step 60. The next mode key 21 designates that function corresponding to the function key which is selected next will be performed after the termination of the present function. This selected "next function" can be, for example, one of recording, reproducing, stop, rewinding and fast forwarding.

At this time, the program waits for a time period for a user to select the function which will be processed as the next function by the VTR. Specifically, at step 70 if no function key is selected, the timer is set to count for 1 sec, and processing cycles through steps 70, 200, 210, 220, and back to 70 until a function key is selected or the count of the timer exceeds a predetermined value T. If no function key is selected during the waiting period the program proceeds to step 230.

However, in the step 70, if a function key is selected before the termination of the waiting period, the status of the NM flag is checked at step 80. If the NM flag has been previously set (NM flag=1), that is, when a next function has already been designated, the program proceeds to step 100 from step 90 and reads the next function stored in the memory, a stored next function. While, if the NM flag is in reset state (NM flag=0), that is a next function has not been previously selected, the program jumps from step 90 to step 110.

At step 110, the selected next function is checked to determine whether it is an allowable next function with respect to the current operating function or a preceding function stored in memory. For example, if selected next function is the same as the present operating function (e.g. both the present operating function and the selected next function are a reproducing function), the selected next function is not an allowable next function. Similarly, the selected next function is not allowable if the selected next function is one which cannot be performed after termination of the current function (e.g., selected next function is reproducing or recording, whereas the current operating function is a fast forward operation). Finally, the selected next function is not allowable if selected next function is recording, FF, REW, or REC mode and no tape cassette has been inserted in to the VTR.

If the selected next mode is determined to be not allowable at step 110, the program proceeds to step 120 and sets the EN flag to 1 ("EN flag ←1"). Simultaneously, a display device such as LED in the display portion 30 is operated inform the user of the unacceptability of the selected next function and processing returns to step 60.

When an allowable next function has been selected, the program proceeds to step 130 and EN flag is set ("EN flag←1"). At step 140, the selected next function is stored in the memory, and then at step 150, the NM flag is set. Thereafter, in order to accommodate storage of another selected next mode which is selected later, an address of the memory at step 160 is increased by 1, and at step 170 an operation of checking whether the next mode key 21 is again generated or not through a keyboard 20 or a remote transmitter 40 is executed. At this time, if the next mode key 21 is generated at step 180, operation proceeds to step 60.

Accordingly, if the next mode key 21 and a next function are again selected successively, the above-mentioned steps 60 to 170 are repeated so that another next function is recorded sequentially in the memory. The memory is operated on a FIFO (First-In First-Out) basis.

On the other hand, if the next mode key 21 is not selected at step 180, the present memory address is stored at step 190, and processing proceeds to step 240. At the step 240, completion of the present operating function checked. At step 250, if the completion occurs, the an NM flag is analyzed at the step 260. At 270, the program branches on the basis of the NM flag. Accordingly, when the NM flag has been set, an address recorded in the memory is read at step 280, the mechanism and circuit control portion 110 is operated in accordance with a next function stored in the memory at the address.

Thereafter, an address of the memory is increased by 1 at step 290, and then an operation of checking whether a present address is a final address is performed. When the value of the address is determined not to be a final address at step 300, the program returns to step 240. While if the address is a final address, another next function is not stored in the memory, and therefore, the NM flag is reset at step 310 and the program returns to step 240.

According to the present invention, if a user wished to perform a stop function, a play function, a REW function, an eject function, and then a power off function, sequentially and continuously in accordance with the present invention, the following key sequence would be entered: 1. next mode key, 2. play function, 3. the next mode key, 4. REW function key, 5. the next mode key, 6. eject function key, 7. the next mode key, 8. power off function key.

As described above, when a user can program a sequential list of function which are sequentially performed upon the completion of a preceding function.

What is claimed is:

1. A method for automatically performing next modes after present modes are completed in an electronic device, the method comprising the steps of:
   checking for selection of modes to be performed as said next modes;
   determining whether the selected modes are allowable modes relative to a preceding mode;
   if said selected modes are not allowable modes, returning to the checking step;
   storing said selected modes as said next modes if said selected modes are allowable modes; and
   checking whether said present modes are completed and performing a stored next mode as a current one of said present modes when said present modes are completed.

2. The method as set forth in claim 1, wherein the storing of said selected modes comprises:
   setting an enable flag and a next mode flag to indicate the selection of a next mode.

3. The method as set forth in claim 2, wherein said storing of said selected modes comprises:
   incrementing an address indicative of sequential locations of said stored next modes.

4. The mode as set forth in claim 3, wherein the performing of said stored next mode comprises:
   accessing said stored next mode in response to a current address;
   determining if said current address is a final address; and
   resetting said next mode flag when said current address is said final address.

5. The method as set forth in claim 4, wherein said performing of said stored next mode comprises:
   checking said next mode flag; and
   completing said stored next mode if said next mode flag is reset.

6. The method as set forth in claim 1, wherein said checking for selection of modes comprises:
   waiting for a set time period for the selection of a mode key after selection of a next key, wherein said next key indicates that modes selected during said set time period are to be performed as stored next modes.

7. The method of claim 1, wherein said method is performed by a video tape recording device.

8. A circuit for automatic processing of a series of operating modes of an electronic device having a plurality of mode keys and a next mode selecting key, the circuit comprising:
   means for detecting activation of said next mode selecting key and producing next mode signals indicative of said activation of said next mode selecting key, and for receiving user input of selected modes by detecting actuation of individual ones of said plurality of mode keys and generating a sequence of operating mode signals indicative of said activation of said individual ones of said plurality of mode keys;
   control means for receiving said next mode signals, for receiving said operating mode signals, for storing said sequence of operating mode signals, and for providing said sequence of operating mode signals; and mechanism controlling means for controlling an operation of said electronic device in response to said sequence of operating mode signals provided by said control means.

9. The circuit of claim 8, further comprised of said control means comparing said operating mode signals to a current operating mode and determining entry of said selected modes from said current mode.

10. The circuit of claim 9, further comprised of said control means rejecting said selected modes when said selected modes be entered from said current operating mode.

11. The circuit of claim 8, further comprised of said control means providing a predetermined time period for detection of said actuation of said individual ones of said plurality of mode keys after receipt of said next mode signals.

12. The circuit of claim 8, further comprised of said control means advancing an address location in response to said storage of said sequence of operating mode signals.

13. The circuit of claim 12, further comprised of said control means accessing the memory location of a current mode and terminating execution when said memory location is a final location.

14. The circuit of claim 8, further comprised of said control means determining the completion of a current mode and switching to a next sequential mode stored as a next one of said sequence of operating mode signals.

15. A method for programming the operation of a video tape recording device, said method comprising:
   performing present operating modes and checking to determine if a next key is selected by a user of the device;
   each time said next key is selected, checking to determined if one of a plurality of mode keys is selected by a user of the device within a time period;
   storing operational modes corresponding to the selected mode keys selected within said time period as next modes in a memory;
   checking if operations of the device in said present operating modes are completed; and
   when operations of the device in said present operating modes are completed, performing said next modes, said next modes being provided by said memory on a first-in first-out basis.

16. The method of claim 15, further comprised of initializing a next mode flag, a time counter, an enable flag, and a memory address register when said video recording device is turned on.

17. The method of claim 16, wherein said storing of operational modes further comprises setting said next mode flag to indicate storage of said next modes and incrementing said address register.

18. The method of claim 15, wherein said operational modes are not stored as said next modes if said operation modes can not be performed after preceding modes.

19. The method of claim 15, wherein said operational modes are not stored as said next modes if said operation modes are not allowable modes relative to prior modes.

* * * * *